United States Patent [19]

Bowers et al.

[11] Patent Number: 4,885,738

[45] Date of Patent: Dec. 5, 1989

[54] METHOD OF AND APPARATUS FOR ESTABLISHING A WIDEBAND COMMUNICATION FACILITY THROUGH A SWITCHED COMMUNICATIONS NETWORK HAVING NARROW BANDWIDTH TIME DIVISION MULTIPLEXED CHANNELS

[75] Inventors: Thomas E. Bowers, Warrenville; Alan E. Frey, Naperville; Howard A. Kerr, West Chicago, all of Ill.; Larry A. Russell, Aberdeen, N.J.; Roger E. Stone, Naperville, Ill.

[73] Assignee: American Telephone and Telegraph Company, AT&T Bell Laboratories, Murray Hill, N.J.

[21] Appl. No.: 80,712

[22] Filed: Jul. 31, 1987

Related U.S. Application Data

[63] Continuation of Ser. No. 815,400, Dec. 31, 1985, Pat. No. 4,704,716.

[51] Int. Cl.[4] .......... H04Q 11/04

[52] U.S. Cl. .......... 370/58.1; 370/68; 370/110.1; 370/84

[58] Field of Search .......... 370/58, 84, 89, 79, 370/95, 118, 63, 68, 61, 68.1, 110.1, 59

[56] References Cited

U.S. PATENT DOCUMENTS

| | | | |
|---|---|---|---|
| 4,393,497 | 7/1983 | Cantwell, Jr. | 370/89 |
| 4,504,946 | 3/1985 | Raychadhuri | 370/95 |
| 4,520,479 | 5/1985 | Grima et al. | 370/84 |
| 4,524,440 | 6/1985 | Orsic | 370/84 |
| 4,549,292 | 10/1985 | Isaman et al. | 370/89 |
| 4,556,972 | 12/1985 | Chan et al. | 370/95 |
| 4,577,312 | 3/1986 | Nash | 370/84 |
| 4,628,502 | 12/1986 | Boulard et al. | 370/84 |
| 4,679,191 | 7/1987 | Nelson et al. | 370/89 |

FOREIGN PATENT DOCUMENTS

| | | | |
|---|---|---|---|
| 0053267 | 6/1982 | European Pat. Off. | |
| 0119843 | 9/1984 | European Pat. Off. | |
| 0237794 | 11/1985 | Japan | 370/89 |

OTHER PUBLICATIONS

P. J. Marino et al., "AT&T Communications ISDN Plans", IEEE *International Conference on Communications,* 1985, vol. 1, Jun. 23–26, 1985, pp. 9.6.1–9.6.5.

"Integrated Services Digital Network (ISDN) Primary Rate Interface", Preliminary Technical Reference, PUB41459, AT&T Communications, Jun. 1985, Chapter IV, pp. 11–30.

"Customer Controlled Reconfiguration A Service Function of ACCUNET SM T1.5", Preliminary Technical Reference, PUB54015, AT&T Communications, Jan., 1984, pp. 1–11.

R. B. Abbot et al., "Digital Access and Cross-Connect System—System Architecture", *National Telecommunications Conference,* vol. 1, Nov. 29–Dec. 3, 1981, pp. B1.2.1–B1.2–7.

S. Andresen, "A Novel STS Structure", *Colloque Internation De Communication,* Paris, May, 1979, pp. 405–412.

(List continued on next page.)

*Primary Examiner*—Douglas W. Olms
*Assistant Examiner*—Curtis Kuntz
*Attorney, Agent, or Firm*—P. Visserman

[57] ABSTRACT

Method and apparatus are disclosed for establishing a wideband communication facility from a plurality of narrow bandwidth channels through a switched communications network from a first to a second terminal in response to a call from the first terminal indicating a customer-selected bandwidth for the wideband facility. Apparatus is also disclosed for establishing a wideband communication path through an illustrative switching system interconnecting groups of narrowband time division multiplexed channels established for the wideband facility. The path has a bandwidth greater than any of the TDM channels. Additional buffer memories and memory control arrangements are added to the initial and final stages of a time-space-time switching network to prevent any of the time slot data of a given time frame from being delayed and included in another time frame.

10 Claims, 10 Drawing Sheets

OTHER PUBLICATIONS

Fukinuki et al., "Structure of Time Division Switching Network", *International Switching Symposium,* Kyoto, Japan, Oct. 25-29, 1976, pp. 411-1-1/411-1-8.

Gotoh et al., "Design Concepts of a Digital Switching System for Higher Performance", *IEEE National Telecommunications Conference,* Houston, Nov. 30-Dec. 4, 1980, vol. 1, pp. 19.2.1-19.2.5.

Nippon Denki K.K. et al., "Multiple Channel", *Patent Abstracts of Japan,* vol. 3, No. 54, (E-109), May 10, 1979, p. 77e109.

TELECOMMUNICATIONS NETWORK
SWITCHING SYSTEM
SWITCHING NETWORK
TMS
TSI
TSI
TSI
DIF
DIF
DIF
CSIU
CP
CCS TERM
STP
DIGITAL TERMINAL INTERFACE UNIT
DIGITAL TERMINAL INTERFACE UNIT

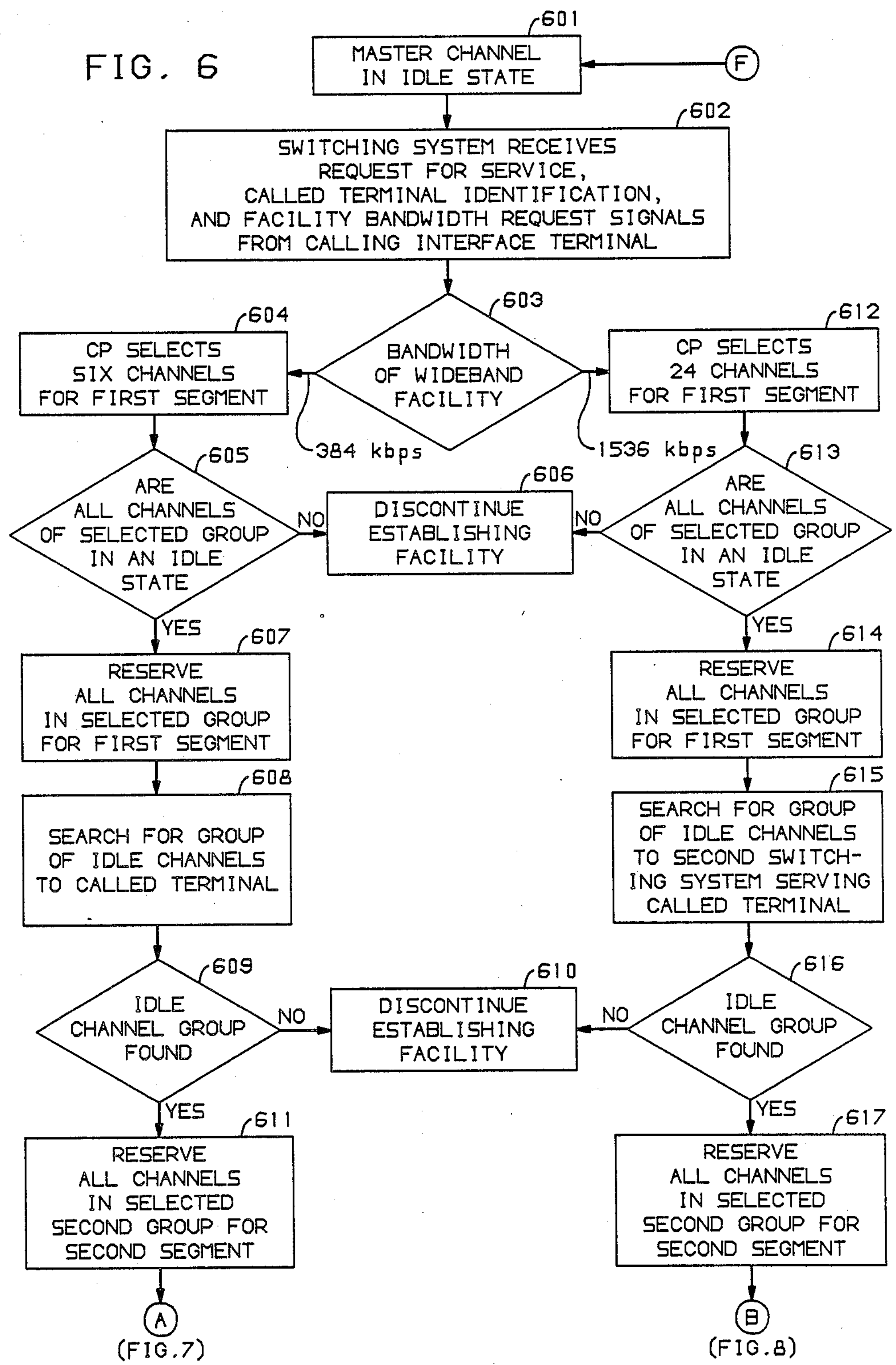
FIG. 6
601
MASTER CHANNEL IN IDLE STATE
F
602
SWITCHING SYSTEM RECEIVES REQUEST FOR SERVICE, CALLED TERMINAL IDENTIFICATION, AND FACILITY BANDWIDTH REQUEST SIGNALS FROM CALLING INTERFACE TERMINAL
603
BANDWIDTH OF WIDEBAND FACILITY
384 kbps
1536 kbps
604
CP SELECTS SIX CHANNELS FOR FIRST SEGMENT
612
CP SELECTS 24 CHANNELS FOR FIRST SEGMENT
605
ARE ALL CHANNELS OF SELECTED GROUP IN AN IDLE STATE
NO
606
DISCONTINUE ESTABLISHING FACILITY
NO
613
ARE ALL CHANNELS OF SELECTED GROUP IN AN IDLE STATE
YES
607
RESERVE ALL CHANNELS IN SELECTED GROUP FOR FIRST SEGMENT
YES
614
RESERVE ALL CHANNELS IN SELECTED GROUP FOR FIRST SEGMENT
608
SEARCH FOR GROUP OF IDLE CHANNELS TO CALLED TERMINAL
615
SEARCH FOR GROUP OF IDLE CHANNELS TO SECOND SWITCH-ING SYSTEM SERVING CALLED TERMINAL
609
IDLE CHANNEL GROUP FOUND
NO
610
DISCONTINUE ESTABLISHING FACILITY
NO
616
IDLE CHANNEL GROUP FOUND
YES
611
RESERVE ALL CHANNELS IN SELECTED SECOND GROUP FOR SECOND SEGMENT
YES
617
RESERVE ALL CHANNELS IN SELECTED SECOND GROUP FOR SECOND SEGMENT
A
(FIG.7)
B
(FIG.8)

METHOD OF AND APPARATUS FOR ESTABLISHING A WIDEBAND COMMUNICATION FACILITY THROUGH A SWITCHED COMMUNICATIONS NETWORK HAVING NARROW BANDWIDTH TIME DIVISION MULTIPLEXED CHANNELS

CROSS-REFERENCE TO RELATED APPLICATION

This application is a continuation of T. E. Bowers et al., entitled "Method and Apparatus for Establishing a Wideband Communication Facility Through a Communications Network Having Narrow Bandwidth Channels", Ser. No. 815,400, filed Dec. 31, 1985 now U.S. Pat. No. 4,704,718.

TECHNICAL FIELD

This invention relates to communications networks having relatively narrow bandwidth time division multiplexed (TDM) channels and to switching systems for establishing therethrough a wideband communication facility wider than any of the TDM channels. The invention specifically pertains to arrangements for establishing a wideband communication facility through the network from a first to a second communications terminal without introducing time frame delay variaations between channels that are grouped together to form the wideband facility.

BACKGROUND OF THE INVENTION

While the existing public-switched telecommunications networks can offer access to a number of customer terminals requiring wideband data service, most digital communication within the switched network is limited to 64 Kilobits per second (Kbps) due to the constraints imposed by existing switching systems and transmission facilities.

In those specific applications requiring greater bandwidth, combining several narrowband channels to form a wideband facility between customer terminals via the network has been suggested in the prior art. One problem with these prior art arrangements is that each narrowband channel between customer terminals is established independently of the others, thereby establishing transmission paths with different transmission equipment, different lengths, and different propagation times.

A second problem occurs when the data from grouped channels are not switched through a switching system in the same order as the data was received. This typically occurs when the timem slot interchanger of the switching system causes some, but not all, of the time slot data of a given time frame to be delayed and combined with the time slot data of another time frame.

This second problem is aggravated when more than one stage of time multiplexed switching is utilized in a switching system. The variations in the length of the physical paths between two switching stages associated with the combined channels causes propagation time variations and time slot data misalignment. One prior art arrangement corrected these problems by sending a test signal at the beginning of a call to compute any delay of data from one time frame to another and by introducing delay in selected ones of the narrowband channels to correlate the ddata into its original patterns. In addition to introducing costly equipment to the network, this prior art arrangement does not address the problem of how to correct for any time slot data delay variations that may occur after an initial correction is made.

SUMMARY OF THE INVENTION

The foregoing problems are solved and a technical advance is achieved in an illustrative switched telecommunications network having narrow bandwidth time division multiplexed (TDM) channels by method of and apparatus for establishing a wideband communication facility through the switched network from a first to a second communications terminal in response to a call from the first terminal, the wideband facility having a customer-selected bandwidth greater than the bandwidth of any of the TDM channels. Advantageously, a customer may select the bandwidth of the wideband facility on a per call basis. Furthermore, TDM channels are selected and processed together through the illustrative network to reduce significantly differences in the path length of the channels through the network.

In one illustrative embodiment, the wideband facility is comprised of two segments where the first segment is established between the calling terminal and a switching system in response to a call indicating the customer-selected bandwidth of the facility and the identity of the called terminal. The switching system of the network further responds to the call by establishing the second segment between the switching system and the called terminal to complete the wideband facility.

The switching system receives a call service request message from the calling terminal on one of the TDM channels designated for out-of-band signaling and selects ones of the TDM channels for establishing the wideband facility with the customer-selected bandwidth indicaated in the call message. With the identity of the called terminal included in the call message, the processor also selects others of the TDM channels to establish the second segment of the facility. As a result, the switched telecommunications network is capable of providing Integrated In the final stage time slot interchanger where read and write cycles do not coincide due to switching network signal propagation delays, three buffer memories and a memory control arrangement are used for selectively writing the time slot data of three time frames into the three buffer memories during three consecutive periods of time. During a fourth period of time subsequent to the first period and overlapping the second and third periods, the time slot data of the first time frame is advantageously read out of the first buffer memory and interchanged after all the time slot data of the time frame has been written into the memory. Thus, all time slot data of a given time frame received from the initial stage time slot interchanger remains in that time frame for transmission on the outgoing channel group.

The meory control arrangement associated with the three buffer memories includes an address arrangement for addressing a location in any of the three memories for each time slot of a time frame and a memory selector for selectively writing the data of a selected time slot of one time frame into an addressed location of one memory and reading the data of another selected time slot of another time frame out of an addressed location of another memory. The addressing arrangement includes a write time slot counter for indicating the three consecutive periods of time to the memory selector and a read time slot counter for indicating the fourth period of time to the selector in which data is to be read out of a memory.

BRIEF DESCRIPTION OF THE DRAWING

The invention is more fully understood from the following detailed description when read with reference to the drawing in which:

FIGS. 6–11 depict an illustrative flow diagram of a method for establishing a wideband facility through a switched network from a first to a second terminal in response to a call from the first terminal.

Services Digital Network (ISDN) services with primary rate interface (23 B+D) signaling on a single T−1 digital carrier transmission line. With two T−1 carrier lines, all 24 channels of one line are available to provide a 1.536 Mbps bandwidth transmission facility for transmitting wideband data through a circuit-switched network. One channel of the other T−1 line is then utilized for common channel out-of-band signaling.

To eliminate time slot delay variations within a switching system, this invention also includes novel apparatus for establishing a wideband communication path through the swiching system for communicating time slot data of a plurality of time frames between groups of narrow bandwidth time division multiplexed channels without any of the time slot data in one time frame being delayed to another time frame.

In the illustrative embodiment of the invention, the wideband communication facility is established between a calling and a called terminal by establishing groups of narrow bandwidth time division multiplexed channels interconnected by one or more switching systems. Each group has a total bandwidth at least equal to the desired wideband facility. Each switching system establishes a wideband communication path to interconnect two groups of channels and advantageously assemblies all the time slot data of a given time frame from one channel group only into the same time frame for transmission on the other channel group.

Buffer memory and control arrangements are incorporated in the initial and final switching stages of a specific time-space-time switching system network advantageously preventing any time slot data of a given time frame from being delayed to and included in another time frame. In an illustrative initial time slot interchanger where read and write cycles coincide, this is accomplished by two buffer memories and a memory control arrangement for selectively writing the data of a selected time slot of one time frame into one buffer memory and reading the time slot data of another time frame out of the buffer memory during the same period of time. In the subsequent period of time following the initial period, the time slot data of the first time frame is read out of the first buffer memory, and the time slot ddata of a third time frame is written into the second buffer memory. As a result, the time slot data of a given time frame is advantageously read out of a buffer memory and interchanged only after all the time slot data of the time frame has been written into the buffer memory. Thus, none of the time slot data of a given time frame is allowed to be delayed and included in another time frame.

DETAILED DESCRIPTION

Figure 1:
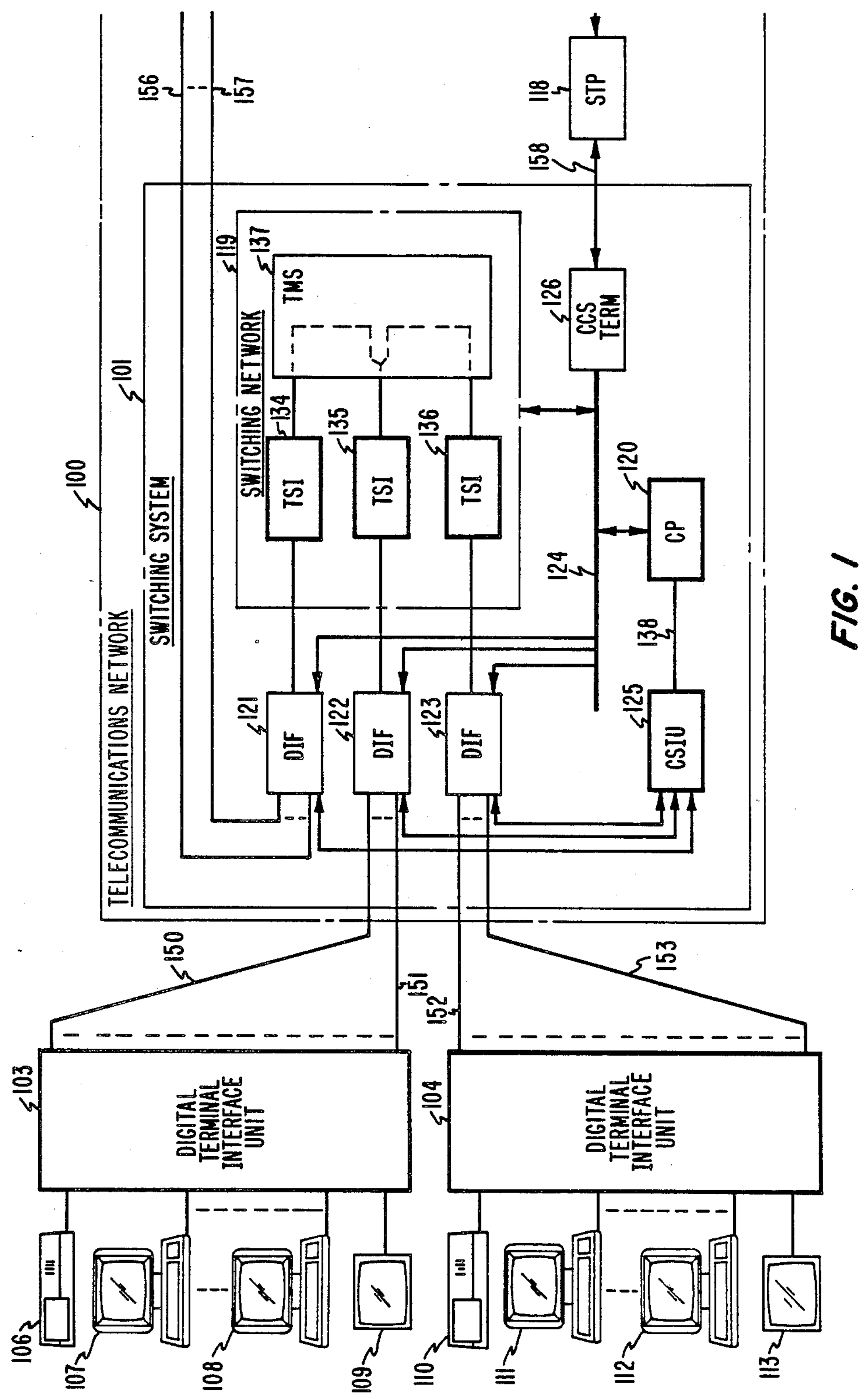
FIGS. 1 and 2 depict an illustrative communications network.
Figures 2, 12:
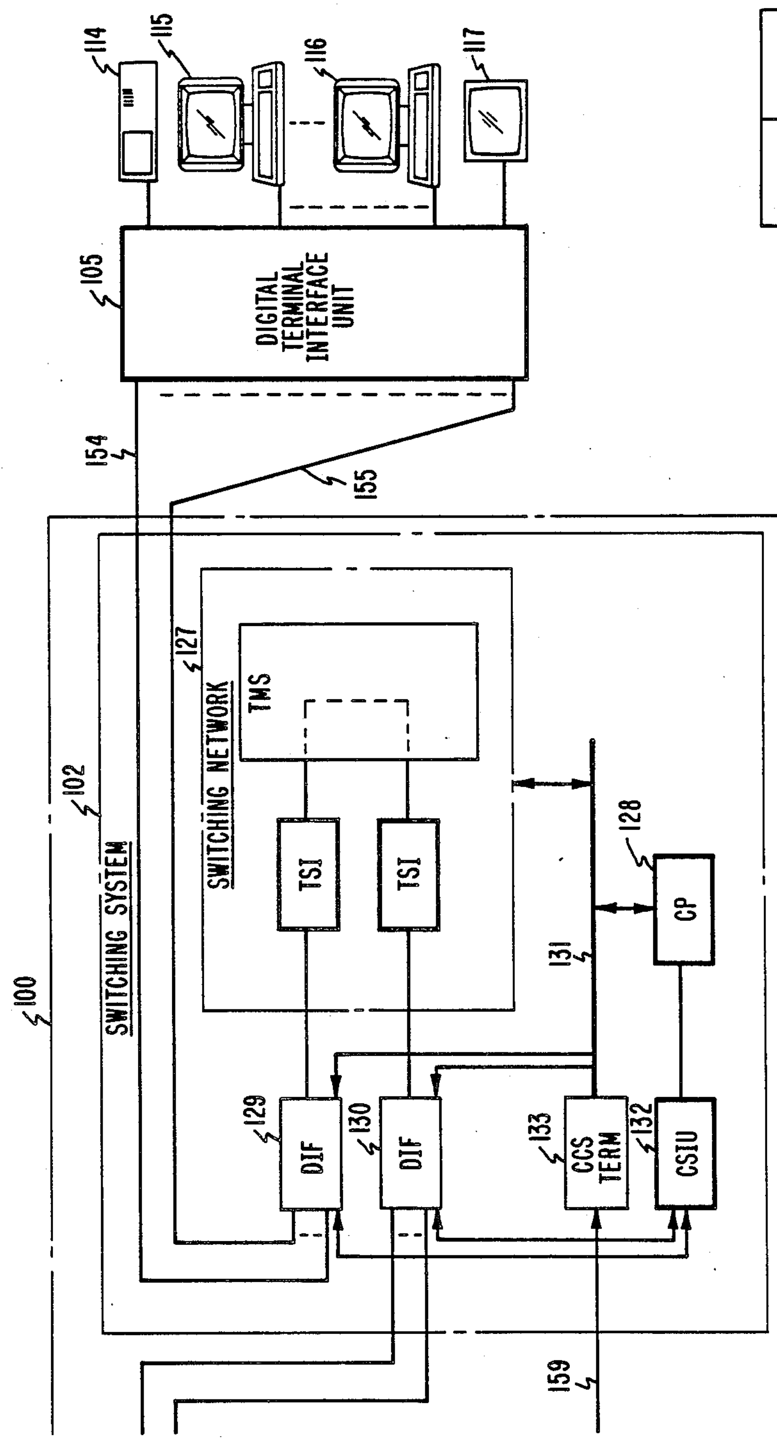
FIG. 12 shows the interrelationship of FIGS. 1 and 2 to form a single illustrative communications network.

Depicted in FIGS. 1 and 2 is an illustrative switched telecommunicaations network 100 including switching systems 101 and 102. This network includes illustrative apparaatus and utilizes an illustrative method for establishing a wideband communication facility between a calling customer interface terminal suchc as 103 and a called customer interface terminal suchc as 104 via a switching system such as 101 in response to a call from calling interface terminal 103. Network 100 serves customer interface terminals 103, 104, and 105 via pluralities of digital lines 150–151, 152–153, and 154–155, respectively. Each digital line such as the well-known T−1 digital carrier line includes 24 time division multiplexed (TDM) channels. With well-known clear channel capability, each channel can serially transmit 64 Kilobits per second (Kbps) of data. To establish a wideband communication facility having a bandwidth wider than any of the narrow bandwidth TDM channels between interface terminals 103 and 104, groups of these TDM channels are formed and interconnected by switching system 101. The switching system includes illustrative apparatus for establishing a wideband communication path through the system for communicating time slot data between the formed groups without any time frame delay variations between the channels of the formed groups. In addition, a wideband communication facility may be established between a calling customer interface terminal 103 and a called customer interface terminal 105 via a plurality of switching systems such as 101 and 102.

Customer interface terminal 103 serves a plurality of customer terminal equipment 106–109, and customer interface terminal 104 serves a plurality of customer terminal equipment 110–113. Customer interface terminal 105 serves a plurality of customer terminal equipment 114–117. As shown, a first plurality of digital lines such as 150–151 interconnects switching system 101 and customer interface terminal 103. A second plurality of digital lines such as 152–153 interconnects switching system 101 and customer interface terminal 104. A third plurality of digital lines such as 154–155 interconnects switchiing system 102 and customer interface terminal 105. Similarly, a fourth plurality of digital lines such as 156–157 interconnects switching systems 101 and 102.

In response to a call includiing a service request signal sent by a calling customer interface terminal, a wideband communication facility having a customer-selected bandwidth wider than any of the 64 Kbps TDM channels is established between calling and called customer interface terminals to transmit data at a much higher rate of, for example, 384 Kbps or 1536 Kbps. The customer-selected bandwidth of the wideband facility is indicated by a facility bandwidth request signal sent by the customer interface terminal to the serving switching system. For example, this is accomplished by establishing a first segment of the wideband communication facility between calling customer interface terminal 103 and switching system 101 in response to a service request sent by the calling customer interface terminal via an out-of-band signaling channel. This first segment comprises a first group of the TDM channels between switching system 101 and customer interface terminal 103 having a total bandwidth at least equal to the customer-selected bandwidth of, for example, 384 or 1536 Kbps as indicated by the facility bandwidth request signal. When a 384 Kbps bandwidth request signal is sent by the calling customer interface terminal, a group of six 64 Kbps channels between the switching system and customer interface terminal are selected to form the first segment of the wideband facility. Alternatively, when a 1536 Kbps bandwidth request signal is sent by the calling customer interface terminal, a group of 24–64 Kbps channels are selected to form the first segment.

A second segment of the wideband facility is established between switching system 101 and called customer interface terminal 104 in response to a called terminal identification signal sent by the calling interface terminal with the service request signal to the switching system. This second segment comprises a second group of TDM channels between switching system 101 and called interface terminal 104 having a total bandwidth at least equal to the bandwidth indicated by the calling interface terminal. With the two segments of the wideband facility established, the switchiing system establishes a wideband communication path having a bandwidth at least equal to the customer-selected bandwidth to interconnect the two segments. The switching system interchanges all the data of a given time frame received from the first channel group only within that time frame for transmission on the second channel group to the called interface terminal. As a result, none of the data of a given time frame is delayed to another time frame, and all the data leaves the switching system in the same order as it was received.

Switching system 101 serves a plurality of customer terminal equipment such as computer 106, data terminals 107 and 108, and video equipment 109 via customer interface terminal 103. Similarly, switching system 101 also serves computer 110, data terminals 111 and 112, and video equipment 113 via customer interface terminal 104. Switching system 102 serves a plurality of customer terminal equipment such as computer 114, data terminals 115 and 116, and video equipment 117 via customer interface terminal 105. The customer interface terminal equipment digitally multiplexes the data from a plurality of customer terminal equipment such as data terminal 107 and 108 and transmits the multiplexed data to a called interface terminal via a wideband communication facility. The called interface terminal demultiplexes the multiplexed data and sends the demultiplexed data to the indicated called terminal equipment such as data terminals 115 and 116. High bit rate customer terminal equipment such as computers 106 and 114 may also be interconnected by a wideband communication facility established between customer interface terminals 103 and 105. A plurality of digital lines such as 156–157 interconnects the switchiing offices of the communication network. Thus, a wideband communication facility may be established between wideband terminal equipment by selectively grouping and interconnecting narrowband TDM channels via the switching systems and customer interface terminals.

Control signaling between switching systems 101 and 102 is facilitated by a well-known common channel signaling (CCS) system transferring information between switching systems 101 and 102. For example, this CCS systems includes well-known signal transfer point 118 and data links 158 and 159 for transferring information separate from the TDM channels. The CCS system transfers messages indicative of well-known billing, control, routing and supervisory information. The CCS messages are also used to transfer requests for service, the customer-selected bandwidth of the communication facility, and called terminal identification. A typical CCS system is described in the *The Bell System Technical Journal,* Vol. 57, No. 2, February, 1974, and in U.S. Pat. No. 3,624,613 of W. B. Smith et al., issued Nov. 30, 1971. Substitution of the 2STP system commercially available from AT&T for the 1STP system described in the cited CCS system reference is recommended for high volume message applications.

Switching systems 101 and 102 are typical stored program-controlled systems such as the 4 ESS TM digital switch which is manufactured by AT&T Technologies, Inc. This switching system is described in *The Bell System Technical Journal,* Vol. 56, No. 7, September, 1977 and Vol. 60, No. 6, Part 2, July–August, 1981, and need not be fully described herein for the reader to understand the present invention. Basically, switching system 101 comprises switching network 119, central processor (CP) 120, and digital interface frames (DIF) 121–123 interconnected by peripheral unit bus 124. Also connected to central processor 120 is customer out-of-band signaling interface unit (CSIU) 125 and CCS terminal 126. Miscellaneous equipment units have not been shown to simplify the drawing. System 102 similarly comprises switching network 127, central processor 128, and digital interface frames 129 and 130 interconnected by peripheral unit bus 131. Also connected to central processor 128 are customer out-of-band signaling interface unit 132 and CCS terminal 133.

Switching network 119 has a time-space-time switching configuration that utilizes time slot interchangers (TSI) 134–136 and time multiplexed switch (TMS) 137. Access to switching network 119 is via digital interface frames 121–123 which perform time division multiplexing and demultiplexing between switching network 119 and digital lines 150–153, 156, and 157. Furthermore, the digital interface frames buffer and synchronize the data between the digital lines and time slot interchangers. Digital interface frames 121–123 also process peripheral control signals from central processor 120 via peripheral unit bus 124.

Time slot interchangers 134–136 provide the initial time-space and final space-time stages of time-space-time switching network 119. The interchangers receive incoming pulse coded modulated (PCM) samples over digital facilities in well-known DS-120 format where 120, eight-bit PCM channels are time division multiplexed with eight maintenance channels to form a 128 time slot frame. The receiving portion of a TSI buffers the incoming lines to allow synchronization of the data with switching network timing and performs the initial time-space switching before transmitting the data to the TMS. After passing through the TMS, the data is returned to the same TSI or another TSI where the final space-time conversion is performed. The TSI then reloads the data onto outgoing DS-120 lines which is transmitted to the appropriate digital interface frame and digital line.

Time multiplex switch 137 is a two-switch array comprised of solid state cross points which provide a multiplicity of unidirectional paths between its inputs and outputs. Each network connection through TMS 137 is made in terms of a pair of unidirectional paths in one of the 128 time slots sharing the paths on a repeating basis at an 8 Kilohertz (Khz) rate. This 8 Khz rate corresponds to a 125 usec time frame period. The switches are controlled by information contained in time slot memories (not shown), and this information is placed in the memory by the central processor under the control of call processing programs.

The majority of the logic, control, storage and translations functions required for the operation of the switching systems are performed by central processor 120. A typical central processor suitable for use illustrative switching system 101 is described in *The Bell System Technical Journal,* Vol. 56, No. 2, February, 1977.

Control signaling between the switching systems is facilitated by well-known CCS terminal 126 that is connected to central processor 120 via peripheral unit bus 124. Customer out-of-band signaling between central processor 120 and customer interface terminal is facilitated by customer out-of-band signaling interface unit 125 connected to central processor 120 via auxiliary unit bus 138. Each plurality of digital lines such as 150–151 includes at least one channel devoted to customer out-of-band signaling. When only one T−1 digital line is utilized between a customer interface terminal and a switching system, one of the 24 TDM channels is utilized for customer out-of-band signaling. When more than one T−1 digital line is utilized, one out of every 48 TDM channels is utilized for customer out-of-band signaling. This is commonly referred to as 23 B+D or 47 B+DD signaling as described in AT&T Communications PUB 41459, "Integrated Services Digital Network (ISDN) Primary Rate Interface", June, 1985, and AT&T Communications PUB 41460 "Special Access Data Channel Interface", October, 1984. With the customer out-of-band signaling arrangement, groups of six or 24 TDM channels may be formed to establish a 384 or 1536 Kbps wideband facility segment. The switching network separates the individual TDM channels and connects the customer out-of-band signaling (D) channel through the network to customer out-of-band signaling interface signaling unit 125 via the digital interface frame and switching network as shown. The customer interface terminals and customer out-of-bnd signaling interface unit 125 utilize a multilayered signaling protocol such as the Q.931 protocol described in the aforementioned PUB references.

Customer interface terminal 103–105 are digital multiplexers for multiplexing and demultiplexing data transferred between the T−1 digital lines and the customer terminal equipment. The customer interface terminal also interfaces the customer out-of-band control signaling between the customer terminal equipment and the out-of-band signaling D channel. For example, a customer interface terminal may be commercially available digital private branch exchange.

As previously suggested, one of the problems associated with grouping a number of TDM channels to establish a wideband communication facility is interchanging all the time slot data of a time frame without any time slot data being delayed to and included in another time frame. For example, when the data in time slot 2 from a first group of TDM channels of a given time frame is to be inserted intoo time slot 17 of the same time frame, the data can be easily written into a buffer memory during time slot 2, and read out of the buffer memory during time slot 17 of the same time frame. However, when the data, for example, from time slot 23 is to be inserted into time slot 7 of the same time frame, the data in time slot 23 cannot be written into a buffer memory during time slot 23 and then read out during time slot 7 of the same time frame along withe he other data from the same group of TDM channels in the same time frame. Accordingly, the data in various time slots from a first group of TDM channels in a given time frame would be inserted into the time slots of another time frame, thus interchanging the order of the data associated with a given wideband communication facility. In addition, the read and write cycles of the final time slot interchanger typically overlap to compensate for switching network delay variations. This also causes time slot data to be delayed from one time frame to another. To solve this delay problem and keep all the data of a given time frame in the same time frame, several buffer memories and memory control selectors were added to the receive and transmit time slot interchanges in switching networks 119 and 127.

Figure 3:
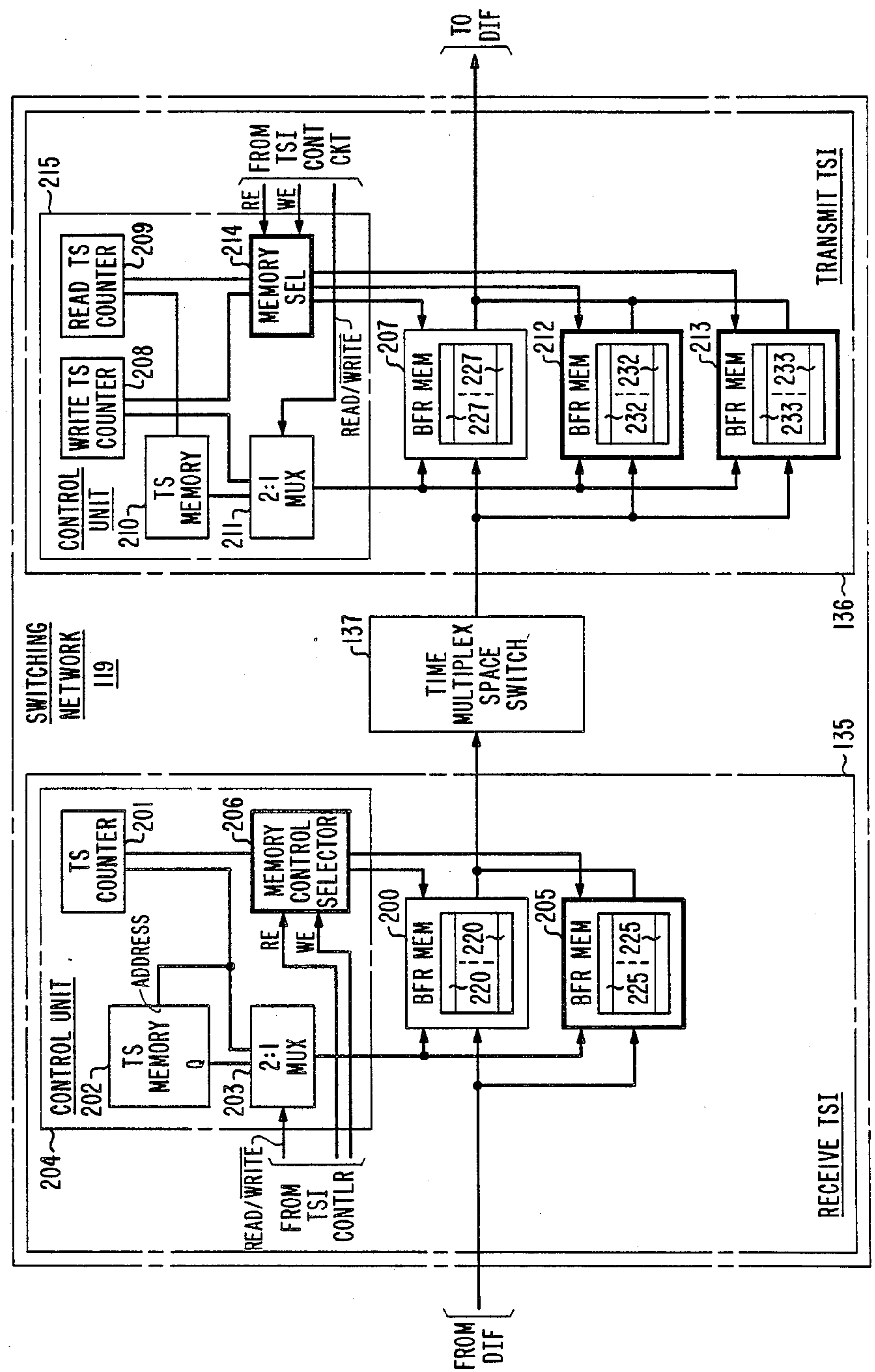
FIG. 3 depicts a block diagram of the switching network utilized in the switching system of FIG. 1.
Figure 4:
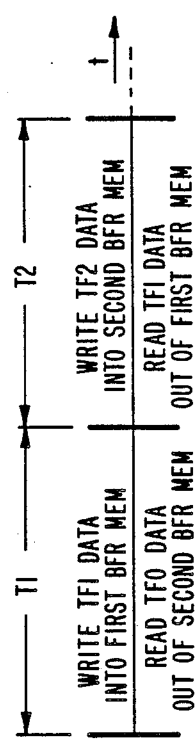
FIGS. 4 and 5 depict illustrative timing diagrams associated with the initial and final time slot interchanger stages of the switching network of FIG. 3.

Depicted in FIG. 3 is a detailed block diagram of receive time slot interchanger 135, transmit time slot interchanger 136, and time multiplex space switch 137 of switching network 119. Receive time slot interchanger 135 includes well-known buffer memory 200, time slot counter 201, time slot memory 202, and address multiplexer 203 interconnected as shown. The functions of these units are well known and more fully described in the aforementioned switching system references. Since the read and write cycles of receive time slot interchanger 135 coincide, only one additional buffer memory 205 and memory control selector 206 were added and connected as showon in interchanger 135. In addition, the read enable (RE) and write enable (WE) control signal leads were connected to memory control selector 206 instead of buffer memory 200. Time slot counter 201, time slot memory 202, time slot multiplexer 203, and memory selector 206 form control unit 204. Each of buffer memories 200 and 205 include a plurality of respective locations such as 220 and 225 addressable by control unit 204 for storing data associated with each time slot of a time frame. This two buffer memory arrangement utilizes a flip-flop or alternating read-write cycle in which all the data of a given frame received from a group of TDM channels is written into only one buffer memory during a 125 microsecond period of time and then read out of the same buffer memory during a subsequent 125 microsecond time period. For example as depicted in FIG. 4, when data of a given time frame TF1 is being written into a first buffer memory 200 during a 125 microsecond time period T1, the data of the previous time frame TF0 is read out of a second buffer memory 205. During the next 125 microsecond period T2, the read/write proces is reversed. For example, during 125 usec time period T2, the data of time frame TF2 is written into second buffer memory 205, and the data of time frame TF1 is read out of first buffer memory 200. Accordingly, the data of a given time frame from a first group of TDM channels is buffered for a full time frame period to ensure that all of the data of the time frame remains in the same time frame when the data in the various time slots is interchanged. Well-known memory control selector 206 under the control of time slot counter 201 and read and write enable control signals from the TSI controller (not shown) alternates the read/write operation between buffer memories 200 and 205.

Transmit time slot interchanger 136 as depicted in FIG. 3 comprises buffer memory 207, write time slot counter 208, read time slot counter 209, time slot memory 210, and address multiplexer 211 interconnected as shown. Write time slot counter 208 and read time slot counter 209 are included in the transmit time slot interchanger to provide a predetermined time slot delay between the read and write cycles of the buffer memories to compensate for time delays caused by the switching network components. The predetermined offset between write time slot counter 208 and read time slot couner 209 could also be generated by using one counter and one address circuit. Accordingly, the read and write cycles of a time frame do not coincide as in receive time slot interchanger 135. Control unit 215 includes write time slot counter 208, read time slot counter 209, time slot memory 210, address multiplexer 211, and memory control selector 214 for addressing and selectively reading and writing locations 227, 232, and 233 in respective memories 207, 212, and 213. To once again ensure that the time slot data of a given time frame remains in that time frame, buffer memories 212 andd 213 under the control of memory control selector 214 interconnected as shown have been added to transmit time slot interchanger 136. As a result, the time slot data of three time frame is consecutively written into buffer memories 207, 212 and 213, respectively, under the control of unit 215. Similarly, interchanged time slot data is read out of buffer memories 207, 212, and 213 under the control of unit 215 during three consecutive time frame periods such that the time slot data of any given time frame is not read out of the same memory when data is being written into the memory.

Figure 5:
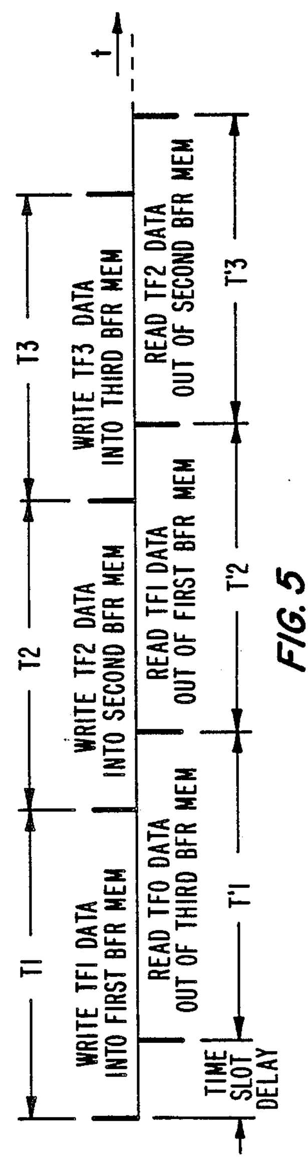

FIG. 5 is a timing diaagram depicting the read/write cycle of transmit time slot interchanger buffer memories 207, 212, and 213. As shown, time slot data of time frame TF1, TF2, and TF3 is consecutively written into first, second, and third buffer memories 207, 212, and 213 during three consecutive 125 usec time periods T1, T2, and T3, respectively, As previously indicated, a multiple time slot delay between the initial read and write cycles of 125 usec time periods T1-T'1, T2-T'2, and T3-T'3 is inserted by write and read time slot counters 208 and 209 such that 125 microsecond time period T'1, for example, starts 17 time slots after time period T1. However, once initiated, the time slot data in third, first and second buffer memories 213, 207, and 212 is consecutively read out during time periods T'1, T'2, and T'3 such that the time slot data of a given time frame is never read out of a buffer memory when data of another time frame is being written into the same buffer memory.

Depicted in FIGS. 6–11 is a flow chart illustrating an illustrative method for establishing a wideband communication facility between a calling and a called customer terminal via at lease one switching system in response to a call from the calling terminal. For purposes of illustration, let it be assumed that a customer served by customer interface terminal 103 desires to establish a wideband communication facility to called customer interface terminal 104 via switching system 101. In this illustrative embodiment, the TDM channels of digital lines 150–157 are segregated into groups of six TDM channels with the first channel in each group being designated as as master channel. All the TDM channels have at least a busy and an idle state. The state of each channel is indicaated, for example, in memory of each customer interface terminal and the switching system serving the channel. In the idle state, the TDM channel is available for use. In the busy state, the TDM channel has been selected for use or is being used. Specifically, it is desired that a wideband communication facility be established between computer 106 and 110 via customer interface terminals 103 and 104 and switchcing system 101. A request for service message signal included in the call is sent from a calling customer interface terminal for a master channel associated with a particular group of TDM channels. Calling customer interface terminal 103 sends the request for service message signal on the out-of-band signaling D channel of digital line 150 for a master channel in an idle state (block 601 of FIG. 6). The request for service message signal typically includes a called terminal identification signal and a facility bandwidth request signal indicating the customer selected bandwidth for the wideband communication facility. Central processor 120 receives the request for service signal from calling customer interface terminal 103 via customer out-of-band signaling interface unit 125 (block 602). In this example, a calling customer can select either a 384 or a 1536 Kbps bandwidth. When a 384 Kbps rate bandwidth is customer selected (block 603), central processor 120 selects six 64 Kbps TDM channels to form a first group of TDM channels for the first segment of the wideband facility between calling interface terminal 103 and switching system 101 (block 604). Stored program-controlled central processor 120 examines the indicated state of each TDM channel in the selected group to determine whether each channel is in an idle state (block 605). When any channel in the selected group is not in an idle state, the central processor sends an out-of-band message to the customer interface terminal 103 denying the service request and discontinues establishing the wideband facility (block 606). When all of the channels in the selected group are in an idle state, the central processor reserves the selected group for the first facility segment by advancing the indicaated state of all the channels in the selected group to a busy state (block 607).

Having reserved the first group of channels for the first facility segment, central processor searches for a group of idle channels to the called terminal as indicated by the called terminal identification signal sent by the calling interface terminal (block 608). The bandwidh of the idle channel group to the called terminal must be at least equal to the customer selected bandwidth as indicated by the facility bandwidth request signal. When an idle channel group cannot be found, the central processor denies the service request from the calling customer terminal and discontinues establishing the wideband facility (blocks 609 and 610). When an idle group of channels has been found, central processor 120 reserves the selected group of idle channels for the second segment of the called terminal by advancing the indicated state of the channels in this second group to a busy state (block 611).

Figure 7:
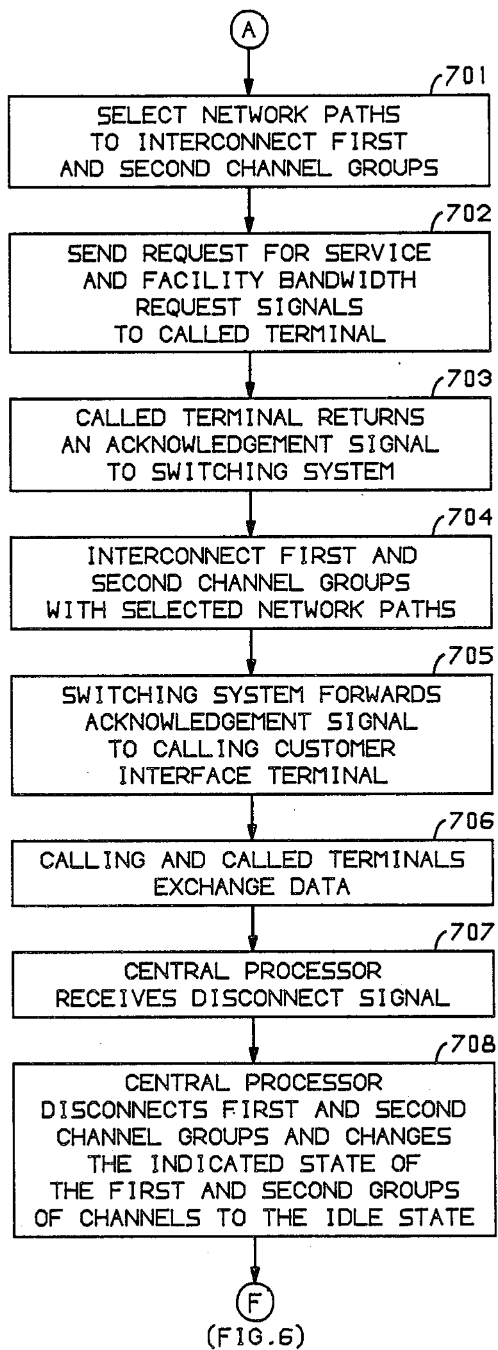

After all the channels in the second group have been reserved for the second facility segment, the central processor selects six network paths through switching network 119 to interconnect the first and second channel groups (block 701 of FIG. 7). The central processor via customer out-of-band signaling interface unit 125 sends the request for service and facility bandwidth request signals to called customer interface terminal 104 (block 702). In response, the called customer interface terminal returns an acknowledgement message signal to central processor 120 of switching system 101 via the out-of-band D signaling channel (block 703). As a consequence, switching network 119 interconnects the first and second channel groups via the selected network paths (block 704). Switching system 101 then forwards the acknowledgement signal to the calling terminal 103 via the out-of-band D signaling channel (block 705).

When the wideband communication facility is established, the calling and called terminals exchange data on the facility via switching network 119 (block 706). A previously described, switching network 119 assembles all the time slot data received in a given time frame from the first channel group only into the same time frame for transmission to the second channel group. This ensures that the data communication between calling and called terminals 103 and 104 is received in the samae order as it was sent.

Upon receiving a disconnect signal from either of the calling and called terminals (block 707), central processor 120 disconnects the first and second channel groups at the switching network and changes the indicated state of the first and second facility group channels to the idle state (block 708). When the indicataed state of all channels in the first and second groups is changed to the idle state, the channels are available for subsequent use by the customer terminal equipment served by customer interface terminals 103 and 104.

A previously suggested, a wideband communication facility may interconnect two customer interface terminals through two or more switching systems. To illustrate this example, let it be assumed that computers 106 and 114 desire to be interconnected with a wideband communication facility via first and second switching systems 101 and 102 in response to a call from the calling terminal. As previously illustrated in FIG. 6, calling customer interface terminal 103 sends a request for service message signal on the out-of-band D signaling channel to switching system 101 for a master channel in an idle state (block 601). Switching system 101 receives the request for service message signal along with the called terminal identification and the facility bandwidth request signals (block 602). This customer signaling information is received via the customer out-of-ban signaling D channel and customer out-of-band signaling interface unit 125. Upon receipt of the service requst, central processor 120 analyzes the service request and determines the customer-selected bandwidth for the wideband facility (block 603). When a 1536 Kbps bandwidth is customer-selected, the central processor selects a first group of 24 channels in a digital line for the first segment of the wideband facility (block 612). The central processor then determines whether the indicated state of all of the first group channels are in the idle state (block 613). When the indicated state of any of the first group channels is not in the idle state, the central processor denies the service request and dicontinues establishing the facility (block 606). On the other hand, when all of the channels in the first group are in the idle state, the central processor reserves all the second group channels by advancing the indicated state of all the channels in the selected group to the busy state (block 614).

After all the first group channels have been reserved, central processor 120 searches for a second group of 24 idle channels to second switching system 102 that serves customer interface terminal 105 (block 615). The second channel group is selected in response to the called terminal identification signal sent by the calling customer interface terminal 103. When an idle channel group to switching system 102 cannot be found, the central processor denies the service request and discontinues establishing the facility (block 610). However, when all ofo the channels in the selected group are indicated in the idle state (block 616), the central procesor reserves the second group channels by advancing their indicated state to busy (block 617).

Figure 8:
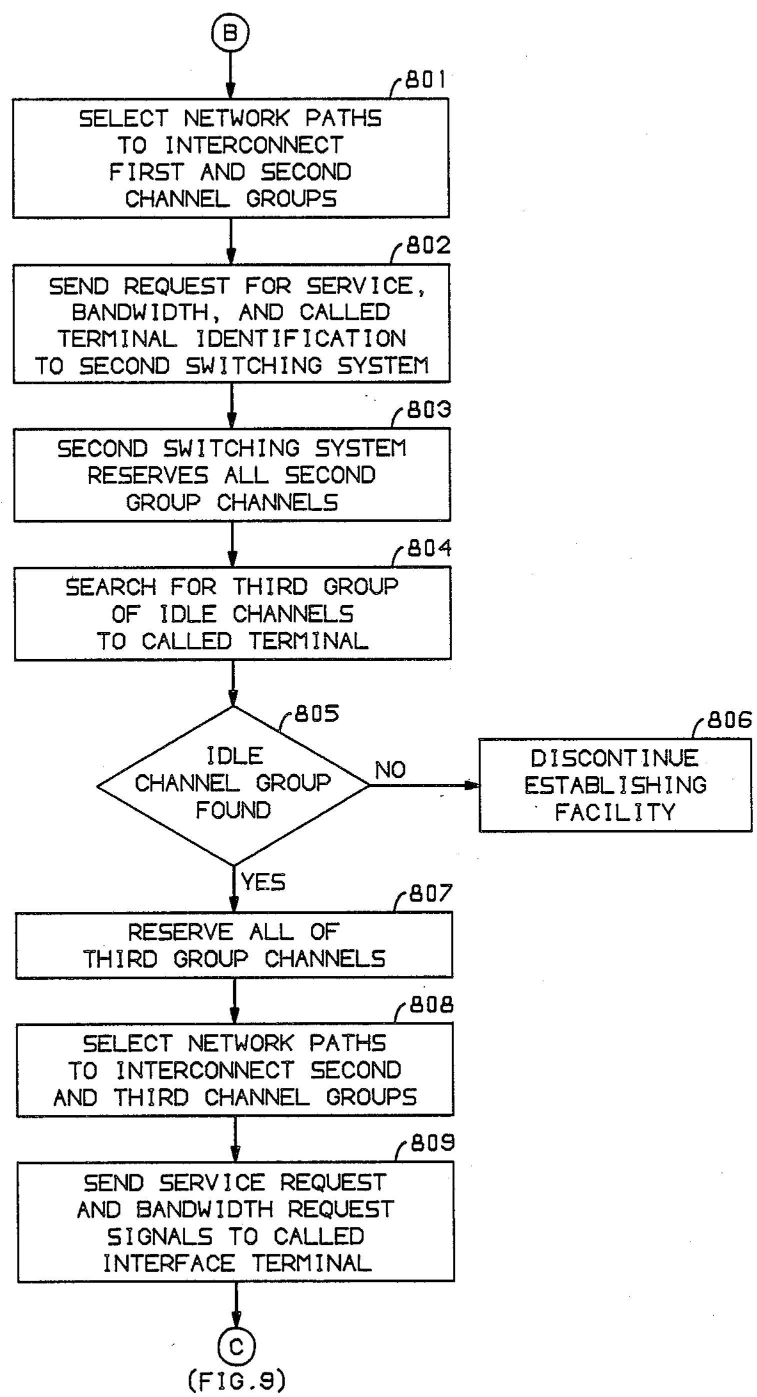

Central processor 120 then selects 24 network paths through switching network 119 to interconnect the first and second channel groups (block 801 of FIG. 8). The request for service, bandwidth, and called terminal identification signals are sent to second switching system 102 via the common channel signaling system (block 802). As shown in FIG. 2, out-of-band signaling information is transferred between switching sysstems 101 and 102 via signal transfer point (STP) 118 and data links 158 and 159. In response, switching system 102 reserves all the second group channels from switching system 101 by advancing their indicated state to the busy state (block 803).

Following a process similar to that performed by switching system 101, central processor 128 of switching system 102 searches for a group of idle channels to the called customer interface terminal in responses to the receipt of the called terminal identification and facility bandwidth request signals (block 804). When an idle group of channels to the called customer interface terminal can not be found (block 805), central processor 128 denies the service request and discontinues establishing the facility (block 806). When a third group of idle channels between switching system 102 and called terminal can be found, central processor 128 reserves all the third group channels be advncing their indicaated state to the busy state (block 807). Central processor 128 then selects 24 network paths through switching network 127 to interconnect the second and third channel groups (block 808). The service request and bandwidth request signals are then sent to the called customer interface terminal 105 (block 809).

Figure 9:
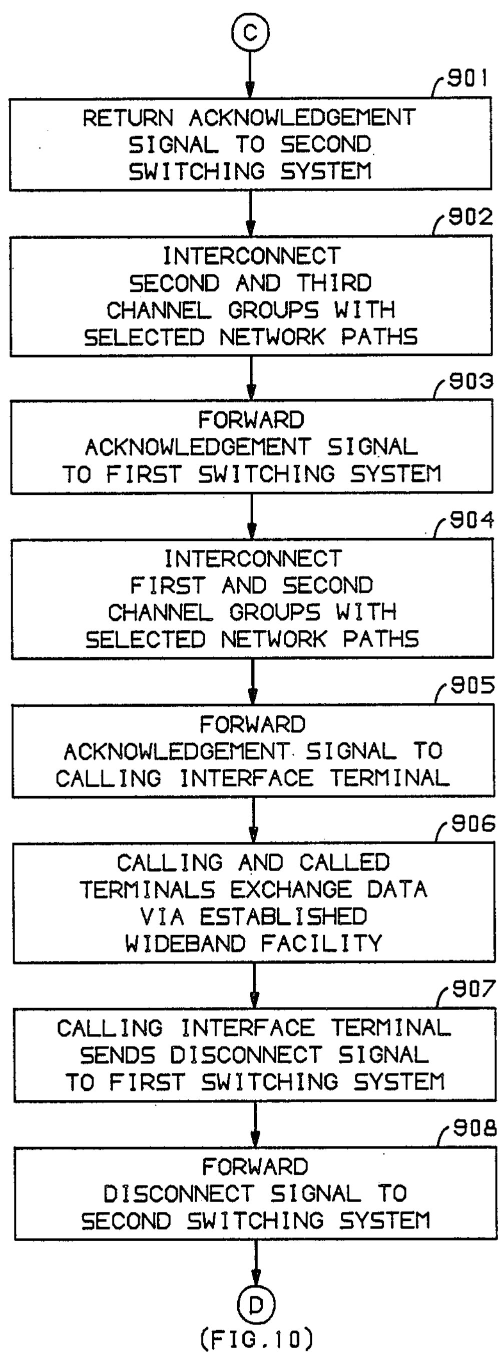
Figure 10:
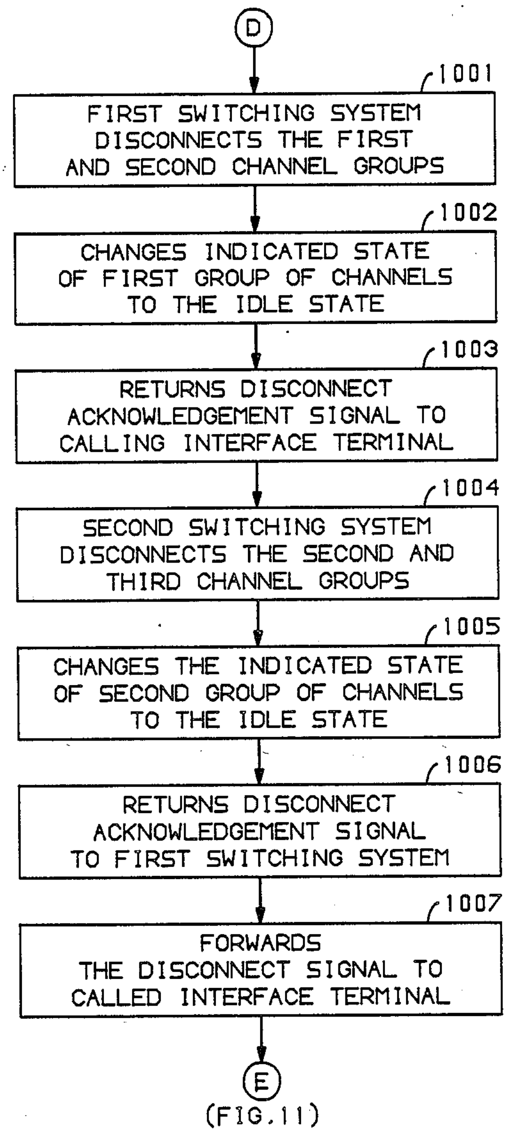

Upon receipt of the service request and bandwidth request signals from switching system 102, called customer interface terminal 105 returns an acknowledgement signal to second switching system 102 (block 901 of FIG. 9). Switching network 127 interconnects the first and second channel groups with the selected network paths in response to the acknowledgement signal received from the called customer interface terminal (block 902). In addition, the acknowledgement signal is forwarded to first switching system 101 (block 903).

Upon receipt of the acknowledgement signal from switching system 102, switching network 119 interconnects the first and second channel groups with the selected network paths (block 904). Switching system 101 then forwards the acknowledgement signal to calling customer interfac signal terminal 103 (block 905), and calling and called terminals exchange data over the widebnd communication facility consisting of the interconnected first, second and third channel groups (block 906).

Upon completion of the data exchange between computers 106 and 114, calling customer interface terminal 103 sends a disconnect signal to first switching system 101 (block 907). In response, switching system 101 forwards the disconnect signal to second switching system 102 (block 908). Switching system 101 also disconnects the first and second channel groups (block 1001 of FIG. 10), changes the indicated state of the first group of channels to the idle state (block 1002), and returns a disconnect acknowledgement signal to calling cusomer interface terminal 103 (block 1003).

Similarly, in response to the receipt of the forwarded disconnect signal second switching system 102 disconnects the second and third channel groups (block 1004), changes the indicated state of the second group of the channels to the idle state (block 1005), returns a disconnect acknowledgement signal to first switching system 101 (block 1006) and forwards the disconnect signal to the called customer interface terminal (block 1007).

Figure 11:
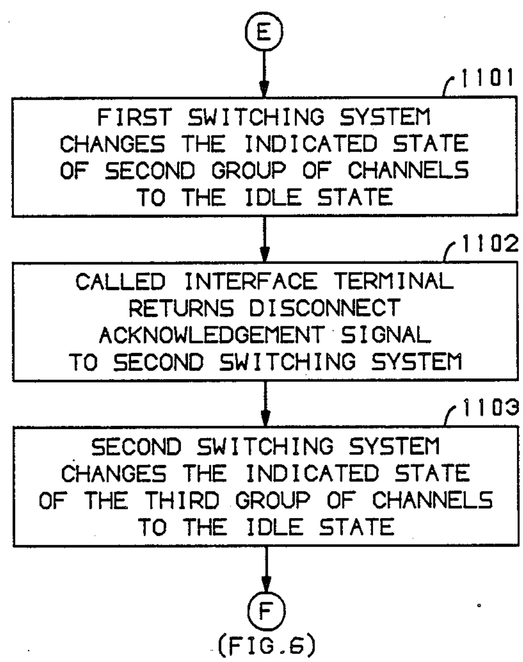

In response to the receipt of the disconnect acknowledgement signal, first switching system 101 changes the indicated state of the second group of channels to the idle state (block 1101 of FIG. 11).

In response to the receipt of the disconnect signal, called customer interface terminal 105 sends a disconnect acknowledgement signal to second switching system 102 (block 1102), and switching system 102 responds by changing the indicated state of the third group of channels to the idle state (block 1103).

It is to be understood that the above-described method of and apparatus for establishing a wideband communication facility through a switched communications network between a first and second terminal in response to a call from the first terminal and apparatus for establishing a wideband communication path for communicating wideband data beween groups of narrowband TDM channels without time frame delay variations between the channels is merely an illustrative embodiment of the principles of this invention and that other apparatus may be devised by those skilled in the art without departing from the spirit andd scope of this invention. In particular, this apparatus may be utilized to establish a wideband communication path through any time division switching system serving narrowband TDM channels without causing time frame delay variations between groups of channels that are formed to establish a wideband communication facility. Furthermore, the method of and apparatus for establishing a wideband facility through a switched network between first and second terminals in resposne to a call from the first terminals may be utilized to provide "bandwidth on demand".

What is claimed is:

1. In a switching system for communicatiing time slot data of a plurality of time frames between first and second groups of time division multiplexed (TDM) channels of relatively narrow bandwidth, apparatus for providing a windband communications path having a bandwidth wider than any of said channels and including time slot interchange means for interchanging only within a time frame time slot data of any given one of said plurality of time frames, said time slot interchange means comprises:

first memory means for storing time data, second memory means for storing time slot data, third memory means for storing time slot data, and control means for selectively writing during first, second, and third consecutive periods of time the time slot data of a first time frame received from said first channel group into said first memory means during said first period of time, the time slot data of a second time frame received from said first channel group into one of said second and third memory means during one of said second and third periods of time, and the time slot data of a third time frame received from said first channel group into the remaining one of said second and third memory means during the remaining one of said second and third periods of time, and for reading the time slot data out of said first memory means for transmission to said second channel group during a fourth period of time subsequent to said first period of time and overlapping said second and third periods of time.

2. Apparatus for establishing in a switching system serving first and second groups of time division muliplexed (TDM) channels of relatively narrow bandwidth, a wideband communicaations path having a bandwiddth wider than any of said channels for communicaating time slot data of a plurality of time frames between said first and said second channel groups, including time slot interchange means for interchanging only within a time frame slot data of any given time frame, said time slot interchange means comprising:

first memory means for storing time slot data, second memory means for storing time slot data, third memory means for storing time slot daata, and control means for selectively writing during first, second, and third consecutive periods of time the time slot data of first time frame received from said first channel group into said first memory means during said first period of time, the time slot data of time frame received from said first channel group into one of said second and third memory means during one of said second andthird periods of and the time slot data of a third time from said first channel group into the remaining one of said second and third memory means during the remaining one of said second and third periods of time, and for reading the time slot data out of first memory means for transmission to said second channel group during a fourth period of time subsequent to said first period of time and overlapping said second and third periodds of time;

each of said time frames including a plurality of time slots each for communicating data associated with an individual TDM cchannel;

each of said first, second, and third memory means including a plurality of addressable locations for storing all the time slot data of an individual time frame;

said control means including addressing means for addressing the locations of said first, second, and third memory means and memory selector means for selectively writing the data of a selected time slot of one time frame into a location of one of said memories when addressed and reading the data of another selcted time slot of another time frame out of a location of another of said memories when addressed.

3. The apparatus of claim 2 wherein said addressing means includes a first time slot counter for indicating to said memory selector means said first, second, and third periods of time.

4. The apparatus of claim 3 wherein said addressing means includes a second time slot counter for indicating said fourth period of time to said memory selector means.

5. Apparatus for establishing in a switching system serving first and second groups of time division multiplexed (TDM) channels of relatively narrow bandwidth, a wideband communications path having a bandwidth wider than any of said channels for communicating time slot data of a plurality of time frames between said first and said second channel groups, comprising:

receive time slot interchange means for interchanging only within a first time frame time slot data of any given time frame received from said first channel group; and transmit time slot interchange means for interchanging only within a second time frame subsequent to said first time frame time slot data of said any given frame when all of the time slot data of said any given time frame is received from said first time slot means for transmission on said second channel group:

said transmit time slot interchange means comprising:

first memory means for storing time slot data, second memory means for storing time slot data, third memory means for storing time slot data, and control means for selectively writing during first, second, and third consecutive periods of time the time slot data of said any given time frame into said first memory means during said first period of time, the time slot data of a first other time frame succeeeding said any given time frame into one of said second and third memory means during one of said second and third periods of time, and the time slot data of a second other time frame succeeding said first other time frame into the remaining one of said second and third memory means during the remaining one of said second and third periods of time and reading the time slot data of said any given time frame out of said first memory means during a fourth period of time subsequent to said first period of time and overlapping said second and third periods of time.

6. Apparatus for establishing in a switching system serving first and second groups of time division multiplexed (TDM) channels of relatively narrow bandwidth, a wideband communications path having a bandwidth wider than any of said channels for communicating time slot data of a plurality of time frames between said first and said second channel groups, comprising:

receive time slot interchange means for interchanging only within a first time frame time slot data of any given time frame received from said first channel group; and transmit time slot interchange means for interchanging only within said a second time frame subsequent to said first time frame time slot data of said any given frame when all of the time slot data of said any given time frame is received from said first time slot means for transmission on said second channel group;

said receive time slot interchange means comprising:

first memory means for storing time slot data, second memory means for storing time slot data, and control means during a first period of time for selecively reading all the time slot data of another time frame out of said second memory means and writing all the time slot data of said any given time frame into said first memory means and during a second period of time subsequent to said first period of time for selectively writing the time slot data of a time frame succeeding said any given time frame into said second memory means and reading the time slot data of said any given time frame out of said first memory means.

7. The apparatus of claim 6 wherein said transmit time slot interchange means comprises:

third memory means for storing time slot data, fourth memory means for storing time slot data, fifth memory means for storing time slot data, and control means during third, fourth, and fifth consecutive periods of time for selectively writing the time slot data of said any given time frame into said third memory means during said third period of time, the timem slot data of a first other time frame succeeding said any given time frame into one of said fourth and fifth memory means during one of said fourth and fifth periods of time, the time slot data of a second other frame succeeding said first other time frame into the remaining one of said fourth and fifth memory means during the remaining one of said fourth and fifth periodsd of time and reading the time slot data of said any given time frame out of said third memory means during a sixth period of time subsequent to said third period of time and overlapping said fourth and fifth periods of time.

8. Apparatus for establishing in a switching system serving first and second groups of time division multiplexedd (TDM) channels of relatively narrow bandwidth, a wideband communications path having a bandwidth wider than any of said channels for communicating time slot data of a plurality of time frames between said first and said second channel groups, comprising:

receive time slot interchange means for interchanging only within a first time frame time slot data of any given time frame received from said first channel group; and transmit time slot interchange means for interchanging only within a second time frame subsequen to said first time frame time slot data of said any given time frame when all of the time slot data of said any given time frame is received from said first time slot means for transmission on said second channel group, said receive time slot interchange means comprising first memory means for storing time slot data of said any given time frame, second memory means for storing time slot data of another time frame succeeding said any given time frame, and control means for selectively reading and writing the time slot data of said any given and said other time frames into and out of said first and second memory means during consecutive periods of time.

9. Apparatus for establishing in a switching system serving first and second groups of time division multiplexed (TDM) channels of relatively narrow bandwidth, a wideband communications path having a bandwidth wider than any of said channels for communicating time slot data of a plurality of time frames between said first and said second channel groups, comprising:

receive time slot interchange means for interchanging only within a first time frame time slot data of any given time frame received from said first channel group; and transmit time slot interchange means for interchanging only within a second time frame subsequent to said first time frame time slot data of said any given time frame when all of the time slot data of said any given time frame is received from said first time slot means for transmission on said second channel group;

said transmit time slot interchange means comprising first memory means for storing time slot data of said any given time frame, second memory means for storing time sloto data of a first other time frame succeeding said any given time frame, third memory means for storing time slot data of a second other time frame succeeding said first other time frame, and control means for selectively writing the time slot data of said any given, said first other and said second other time frames into said first, second, and third memory means during consecutive periods of time and for selecively reading the time sloto data of said any given, said first other and said second other time frames out of said first, second, and third memory means during consecutive periods of time after all the time slot data of said first time frame has been written into said first memory means.

10. Apparatus for establishing in a switching system serving first and second groups of time division multiplexed (TDM) channels of relatively narrow bandwidth, a wideband communications path having a bandwidth wider than any of said channels for communicating time slot data of a plurality of time frames between said first and said second channel groups, comprising:

first memory means for storing time slot data;

second memory means for storing time slot data;

first control mens during a first period of time for selectively reading all he time slot data of one of said time frames out of said second memory means and writing all the time slot data of a first time frame into said first memory means and during a second period of time subsequent to said first period of time for selectively writing the time slot data of a second time frame into said second memory means and reading the time slot data of said first time frame out of said first memory means;

third memory means for storing time sloto data;

fourth memory means for storing time slot data;

fifth memory means for storing time slot data; and second control means during third, fourth, and fifth consecutive periods of time for selectively writing the time slot data of said first time frame into said third memory means during said third period of time, the time slot data of said second time frame into one of said fourth and fifth memory during one of said fourth and fifth periods of time, the time slot data of a third time frame into the remaining one of said fourth and fifth periods of time and during a sixth period of time subsequent to said third period of time and overlapping saidi fourth and fifth periods of time reading the time slot data of said first time frame out of said third memory means.

* * * * *